Figure 4:
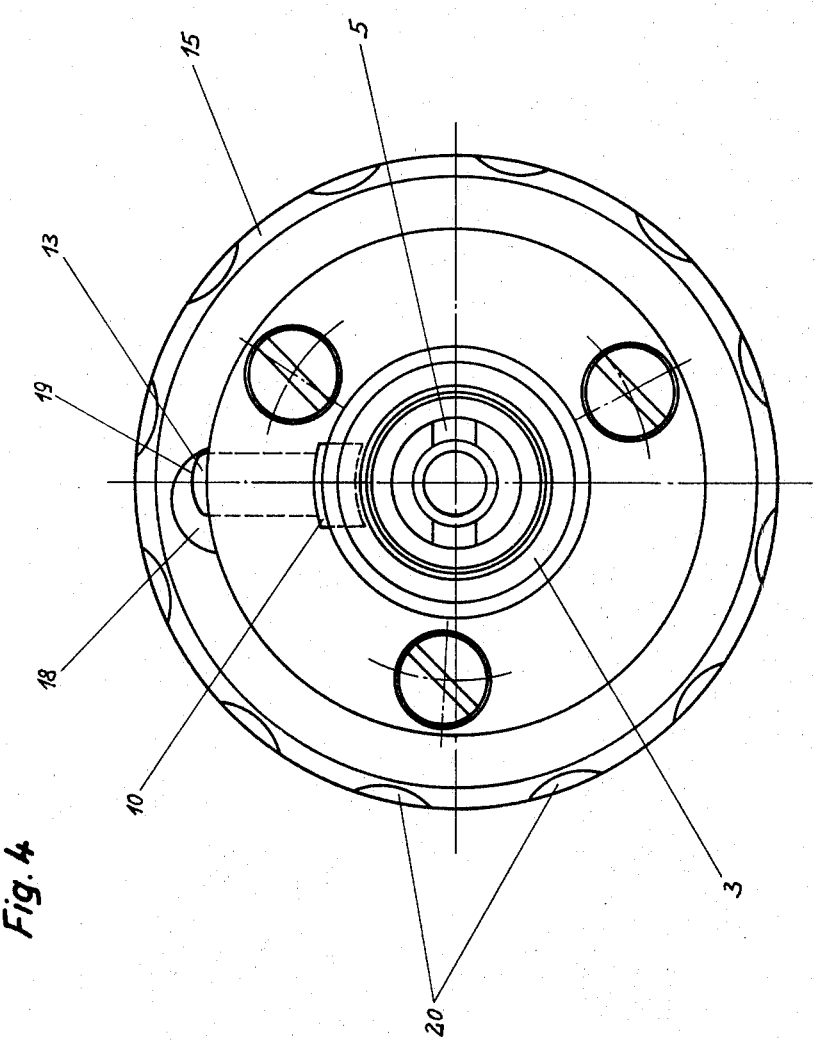

United States Patent [19]

Loge

[11] 3,815,240

[45] June 11, 1974

[54] COUPLING FOR DENTAL HANDPIECES

[75] Inventor: Hans Loge, Biberach/Riss, Germany

[73] Assignee: Kaltenbach & Voigt, Biberach/Riss, Germany

[22] Filed: Oct. 12, 1972

[21] Appl. No.: 296,907

[30] Foreign Application Priority Data

Oct. 13, 1971 Germany............................ 2151041
Sept. 1, 1972 Germany............................ 2243050

[52] U.S. Cl............................ 32/26, 32/27, 285/317
[51] Int. Cl............................................. A61c 1/08
[58] Field of Search.......... 32/26, 27; 285/317, 316, 285/319

[56] References Cited
UNITED STATES PATENTS

| | | | |
|---|---|---|---|
| 1,078,112 | 11/1913 | Storm | 285/317 X |
| 1,857,528 | 5/1932 | Cantell | 285/317 X |
| 2,245,151 | 6/1941 | Martinet | 285/317 X |
| 2,431,268 | 11/1947 | McIntyre | 285/317 |
| 2,476,172 | 7/1949 | Williams | 285/317 X |
| 3,665,606 | 5/1972 | Saupe | 32/26 |

Primary Examiner—Louis G. Mancene
Assistant Examiner—J. Q. Lever
Attorney, Agent, or Firm—Eric H. Waters

[57] ABSTRACT

A coupling for dental handpieces which is readily releasable and does not in any way hinder the dentist, so that there is no danger of unintentional uncoupling. For actuation of the pressure pin, to arrange externally on the sleeve of the drive element to be rotatable and axially non-displaceable a rotation ring the inner walls of which are formed with a recess for engagement of the end of the pressure pin, the depth thereof in the peripheral direction (related to the rotation ring) increasing gradually at least towards one side. If the pressure pin is disposed in the recess, in the snap-in position, then the coupling between the handpiece and the drive element is established. For releasing the coupling, it is then merely necessary to rotate the rotation ring, whereby the bottom of the recess produces, due to the gradual decrease in the depth, pressing-in of the pressure pin which is also gradual, until the coupling hook has travelled out of the annular groove. Coupling is effected in analogous manner. Unintentional actuation of the coupling hook or the pressure pin is impossible with the coupling according to the invention, since the coupling release device, i.e. the rotation ring, is arranged on the drive element and free rotatability between handpiece and drive element is guaranteed due to the engagement of the coupling hook into the annular groove.

10 Claims, 7 Drawing Figures

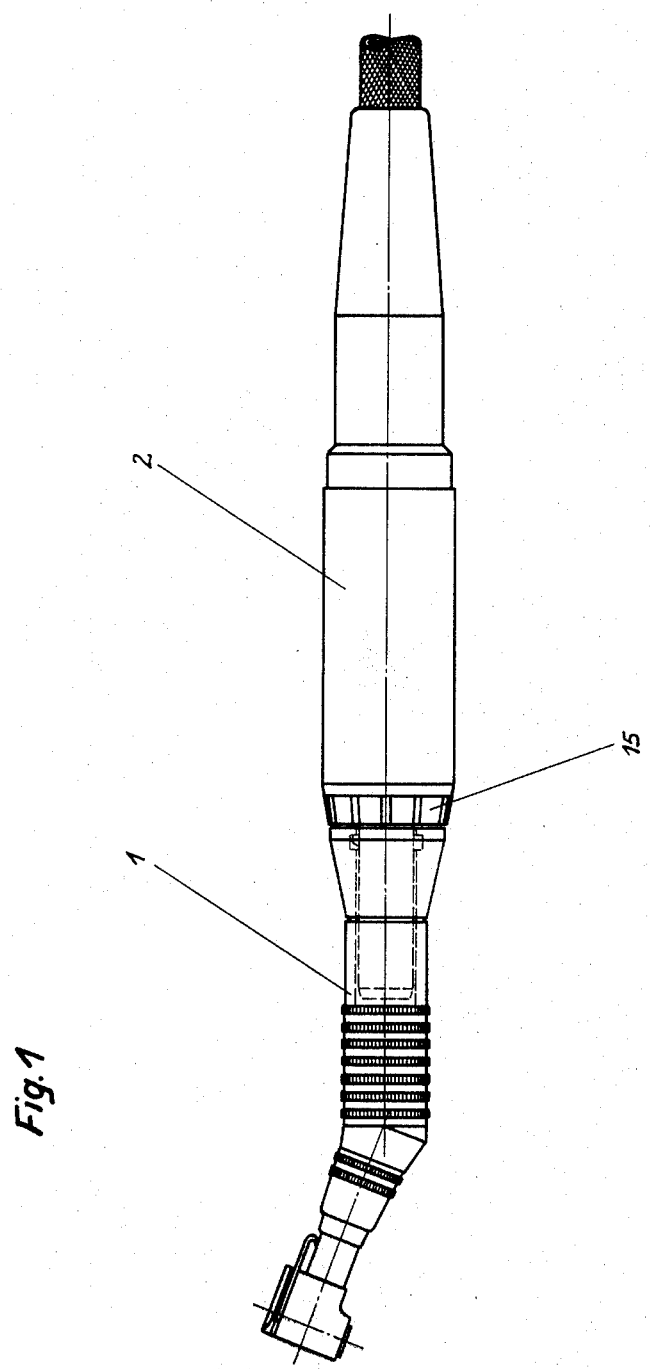

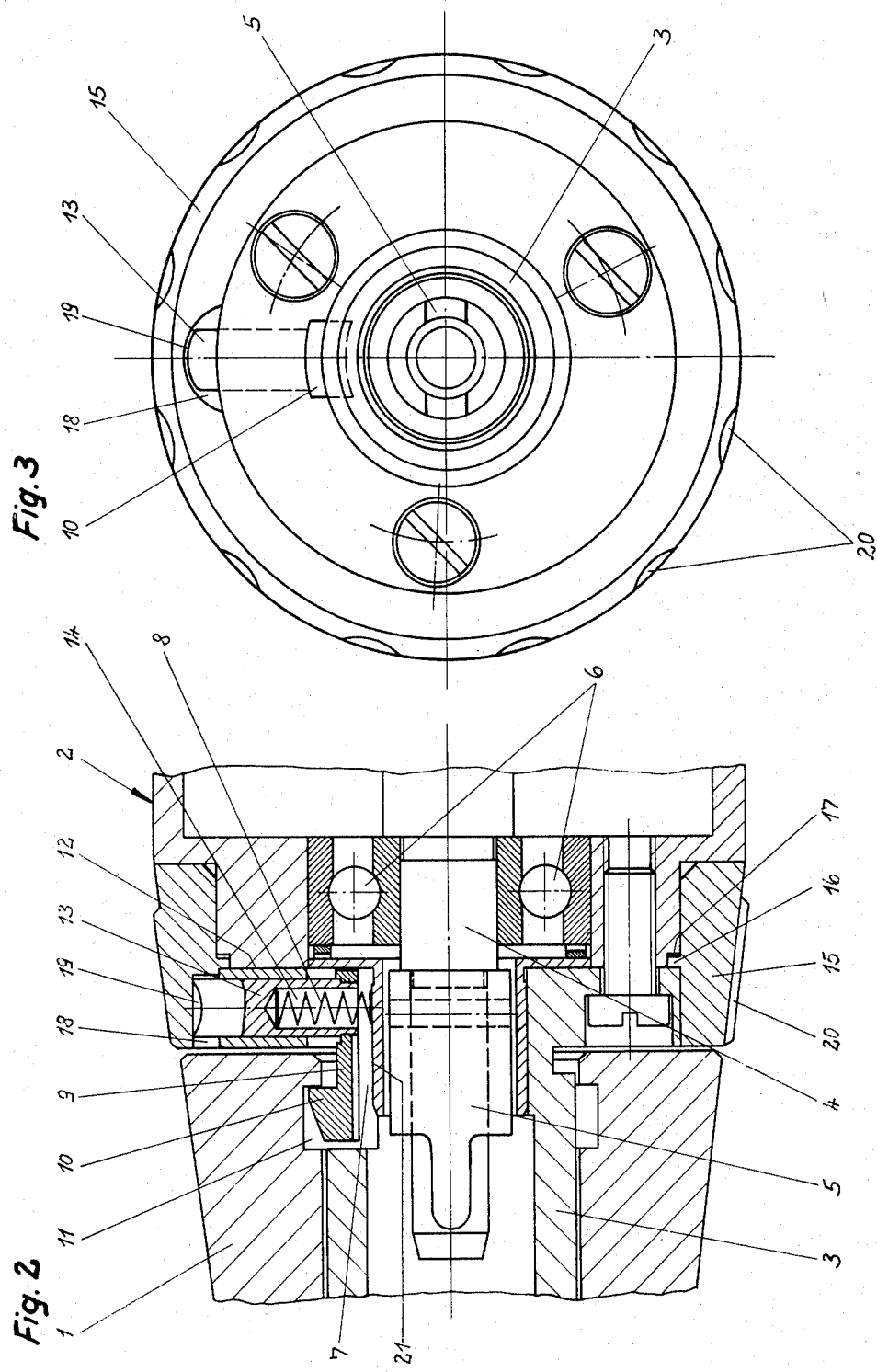

COUPLING FOR DENTAL HANDPIECES

The invention relates to a coupling for connecting a dental handpiece to a cylindrical drive element, with the aid of a coupling hook resiliently mounted in a recess formed in a sliding connection sleeve connected with the drive element, the said coupling hook engaging through the agency of its "nose" into an inner annular groove formed in the handpiece and having a pressure pin extending radially outwardly through an aperture formed in the sleeve of the drive element.

The dental handpieces mentioned may be rectilinear handpieces or angled handpieces. The drive element mentioned may be a turbine, an electric motor, an air motor or the like.

A coupling of this kind is known from German Utility Model No. 6,752,802. In this case, however, the pressure pin projects freely outwardly through the aperture in the sleeve of the drive element, whereby on the one hand the dentist is impeded when grasping and holding the handpiece and, on the other hand, actuation of the pressure pin which, conventionally, has a small diameter of approximately 1.5 mm, is made difficult and, when coupling is frequently effected, pain is felt in the fingers and the fingernails are damaged.

Furthermore, Gernam Offenlegungsschrift No. 1,766,056 discloses a coupling of the above-discussed type which, however, has no pressure pin, the handpiece being provided at its drive-side end with a sleeve surrounding almost the entire drive element. The handpiece has, in the zone of the commencing portion of the said sleeve, an inwardly projecting actuating pin which, by rotating the handpiece relative to the drive element, acts directly on the coupling hook so as to uncouple the latter. This design involves a danger that, on rotating the handpiece relative to the drive element during treatment by the dentist, uncoupling may unintentionally take place. To this must be added the fact that this arrangement of the coupling release device on the handpiece represents an uneconomical solution since, conventionally, due to the possibilities for interchanging afforded by the coupling, very many more handpieces are manufactured than are drive elements.

The invention is based on the problem of how to provide a coupling for dental handpieces which is readily releasable and does not in any way hinder the dentist, so that there is no danger of unintentional uncoupling.

For the solution of the said problem, it is proposed according to the invention, for actuation of the pressure pin, to arrange externally on the sleeve of the drive element to be rotatable and axially non-displaceable a rotation ring the inner walls of which are formed with a recess for engagement of the end of the pressure pin, the depth thereof in the peripheral direction (related to the rotation ring) increasing gradually at least towards one side.

If the pressure pin is disposed in the recess, in the snap-in position, then the coupling between the handpiece and the drive element is established. For releasing the coupling, it is then merely necessary to rotate the rotation ring, whereby the bottom of the recess produces, due to the dradual decrease in the depth, pressing-in of the pressure pin which is also gradual, until the coupling hook has travelled out of the annular groove. Coupling is effected in analogous manner. Unintentional actuation of the coupling hook or the pressure pin is impossible with the coupling according to the invention, since the coupling release device, i.e., the rotation ring, is arranged on the drive element and free rotatability between handpiece and drive element is guaranteed due to the engagement of the coupling hook into the annular groove. Furthermore, the rotation ring does not hinder or impede the dentist. The solution according to the invention is also economical because, as stated, the coupling release device is arranged on the drive element which, as is known, is manufactured in smaller piece-numbers than the handpieces.

Actuation of the rotation ring may be effected with a simple movement of the hand, in such manner that the rotation ring is rotated and simultaneously the handpiece is drawn-off from the drive element. On coupling, the pressure pin snaps under the action of its spring once again into the recess. It is expedient if, according to a further proposal of the invention, the recess is designed to have the shape of a section of a cylinder. Further facilitation of the snapping-in and disengagement of the pressure pin into or out of the recess is achieved if, according to the invention, the end of the pressure pin is designed to have the shape of a section of a cylinder or sphere.

For facilitating actuation of the rotation ring, it is proposed to form the outter walls of the rotation ring with grooving.

In order to achieve the result that the rotation ring, on being rotated into the uncoupling position, requires to be rotated only to a very slight extent and returns, after pulling off the handpiece, automatically into the starting position in which uncoupling can be effected by simple pushing-on with any optional angular position between handpiece and drive element, the invention proposes to so arrange a stop, corresponding to the uncoupling position of the coupling hook, for the pressure pin that the pressure pin still projects, also in the pressed-in uncoupling position, into the recess.

In order to prevent any possibility (in the event of particularly vigorous and "extreme" manipulation of the dental handpiece) of the rotation ring being nevertheless unintentionally rotated, so that undesired uncoupling takes place, it is proposed that the rotating ring and the drive element should be adapted to snap-in relative to each other on engagement, so as to afford the coupling position, of the end of the pressure pin in the recess.

Such snapping-in reliably prevents unintentional rotation of the rotation ring. On the other hand, no excessive force is required, on uncoupling, for releasing the locking effect.

It is expedient if, for snapping-in, a resiliently mounted detent member and a detent recess associated therewith are provided. By this means, the result is achieved that both snapping-in and also disengagement can be effected in especially simple manner.

Further simplification of snapping-in and disengagement is achieved if the detent member comprises a ball resiliently mounted in a blind aperture formed in the drive element, the detent recess being formed in the inner wall of the rotation ring and having circular cross-section the diameter thereof being smaller than the ball diameter. In this case, the ball is, in the coupling position, seated on a circular seating. On moving out of the coupling position, i.e., on snapping-out disengagement, the ball merely requires to be displaced somewhat out of its seat, against the action of the spring.

A further embodiment is characterised in that the detent member and the detent recess are so associated relative to each other and/or so dimensioned that on adoption of the pressed-in uncoupling position of the pressure pin the detent member is, in order to make automatic renewed snapping-in possible, displaced only to a small extent out of the zone of the detent recess.

This embodiment has the advantage that, on releasing the rotation ring after uncoupling, i.e., after removal of the handpiece from the drive element, the rotation ring rotates-back automatically into the starting position, since the detent member is, for the uncoupling or disengaged position, still disposed with the greater part of its volume in the zone of the detent recess The aforementioned automatic return movement of the rotation ring takes place due to the spring acting on the detent member and due to the spring acting on the pressure pin, in which connection the two said springs may, in this case, be equally strong.

Figure 6:
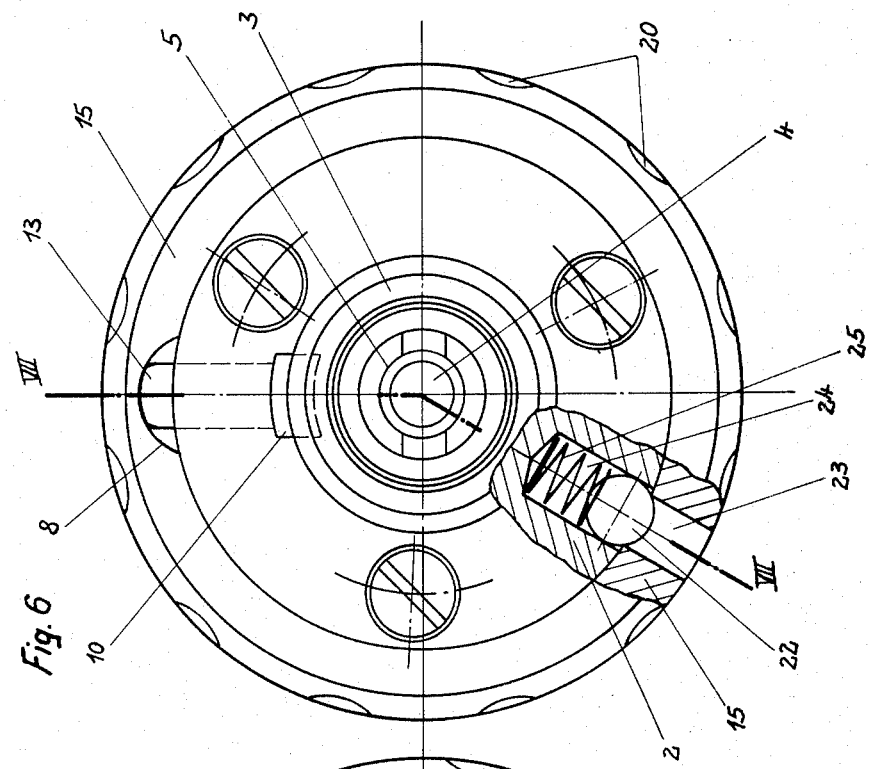
Figure 5:
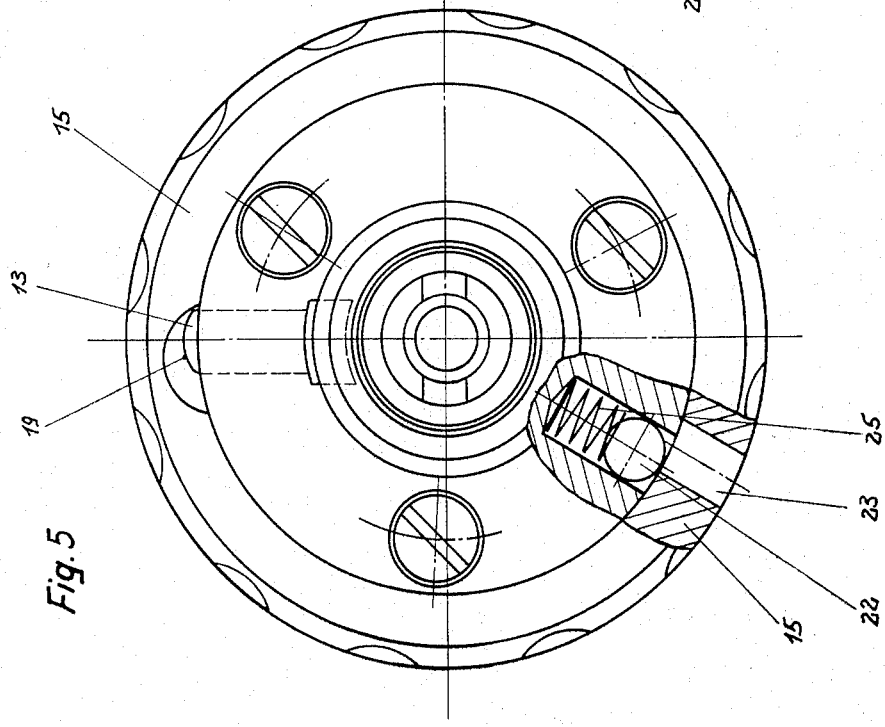
Figure 7:
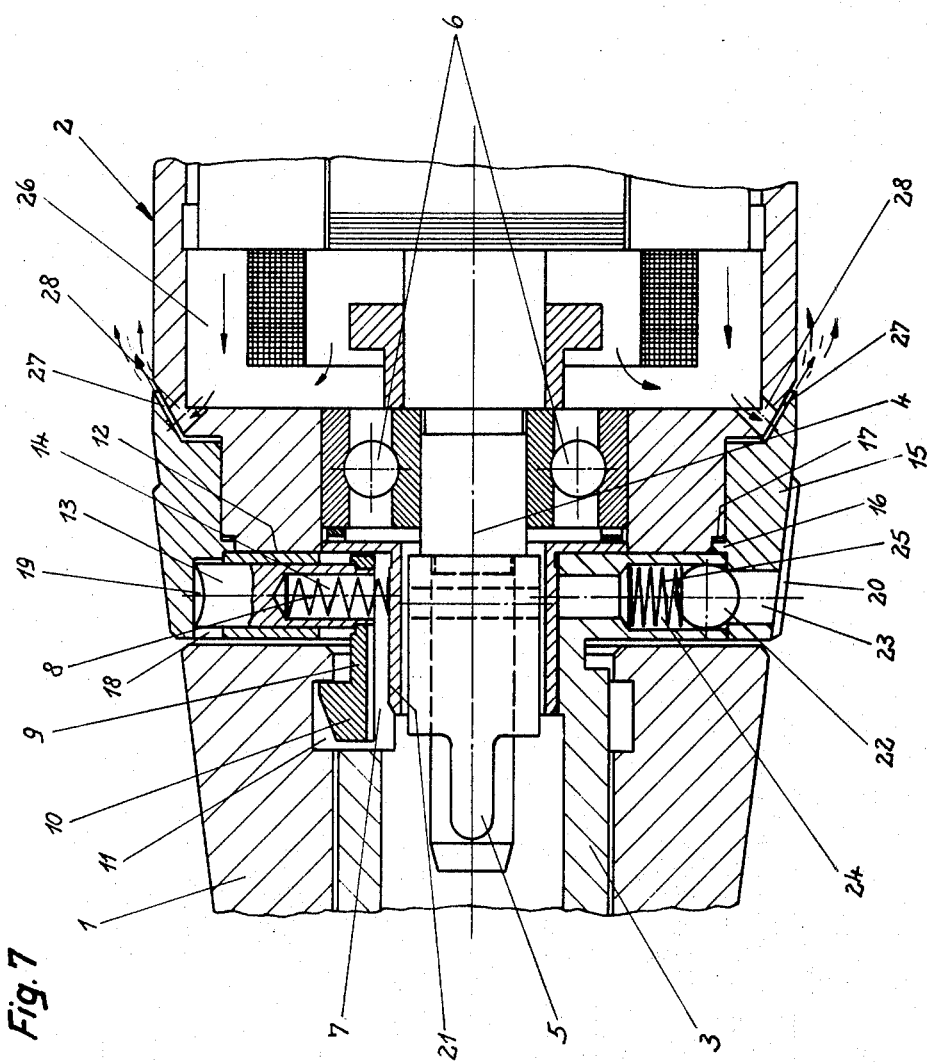

Embodiments of the invention are shown by way of example in the drawings, in which:

FIG. 1 shows a dental handpiece having a drive element coupled to it, as a lateral elevation, FIG. 2 shows the two ends facing each other of a dental handpiece on the one hand and of the drive element on the other hand, in the coupled condition, and shown in axial section, FIG. 3 shows a drive element as an elevational view of the drive side, with the handpiece removed and in the coupling position, FIG. 4 shows the drive element according to FIG. 3, in the uncoupling position, FIG. 5 shows a drive element, as a view of the drive side, with the handpiece removed and shown in the uncoupling position, FIG. 6 shows a drive element according to FIG. 5, in the coupling position, and FIG. 7 shows a section taken along the line VII—VII of FIG. 6 but with the handpiece applied.

Referring to the drawings, reference numeral 1 designates the sleeve of a dental handpiece which, according to FIG. 1, may be an angled handpiece and which, according to FIGS. 1, 2 and 7, is coupled with a drive element 2. The drive element 2 is, in the case of FIG. 1, a miniature electrical motor.

From the drive-side end face of the drive element 2 extends sliding connection sleeve 3 into which, in known manner (as indicated) the drive shaft 4 extends with the entrainment means 5 of the drive element 2. The drive shaft 4 is mounted with the aid of ball bearings 6 in the drive element 2.

Formed in the sliding connecting sleeve 3 is a recess 7 mounted within which, with the aid of a compression spring 8, is a coupling hook 9. The coupling hook 9 engages, through the agency of its "nose" 10 into an inner annular groove 11 formed in the sleeve 1 of the dental handpiece. Fast with the coupling hook 9 is a pressure pin 13 extending radially outwardly through an aperture 12 formed in the drive element 2. At its end facing the interior of the drive element 2, the pressure pin is formed with an axial blind aperture 14 into which the compression spring 18 engages.

For actuating the pressure pin 13, there is arranged externally on the sleeve of the drive element 2, to be rotatable and axially non-displaceable, a rotation ring 15. The axial non-displaceability is provided by means of an inner annular shoulder 16 on the rotation ring 15, engaging in an annular groove 17 formed in the drive element 2.

The inner walls of the rotation ring 15 are, as shown in FIGS. 3 and 4, formed with a recess 18 into which, in the coupling position, the end of the pressure pin 13 engages. The depth of the recess 18 gradually decreases in the peripheral direction — related to the rotation ring 15 — on both sides, the recess 18 having the shape of a section of a cylinder. Similarly, the end 19 of the pressure pin 13 is designed to have the shape of a section of a cylinder. The outer walls of the rotation ring 15 are, for facilitating actuation, formed with grooving 20.

As will be gathered from FIG. 2, there is provided for the pressure pin 13 a stop 21 which, in the present case, is constituted by a sleeve surrounding the entrainment or drive means 5, of the drive element 2. To the said stop 21 corresponds the uncoupling position of the coupling hook 9, the pressure pin 13 being in the position shown in FIG. 4, after the rotation ring 15 has been rotated out of the position shown in FIG. 3 into the position shown in FIG. 4. The stop 21 is so arranged that the pressure pin still projects somewhat into the recess 18 even in the pressed-in uncoupling position according to FIG. 4. In this manner, the rotation ring is prevented from rotating further than necessary for adopting the uncoupling position. The rotation ring 15 therefore travels, after drawing-off the handpiece, under the influence of the compression spring 8, automatically back into the position shown in FIG. 3. On renewed coupling being effected, it is then merely necessary for the handpiece to be pushed on to the sliding connection sleeve 3 until the pressure pin 13 snaps into the recess 8, without any renewed actuation of the rotating ring 15 being required.

The rotation ring 15 and the drive element 2 are, on the end 19 of the pressure pin 13 engaging in the recess 18 according to FIGS. 6 and 7, so as to afford the coupling position, adapted to snap-in relative to each other. For this purpose, there is provided a resiliently mounted detent member 2 and, associated therewith, a detent aperture 23. The detent member 22 consists of a ball mounted with the aid of a spring 25 in a blind aperture 24 formed in the drive element 2. The arrangement is such that the spring 25 tends to press the ball 22 out of the blind aperture 24 the axis of which extends radially relative to the drive shaft 4.

The detent recess 23 is formed in the inner wall of the rotation ring 15 and has circular cross-section, the diameter of the circular cross-section being smaller than the diameter of the ball 22. For reasons connected with manufacturing, the detent recess 23 is designed in the form of an aperture extending through the rotation ring 15. However, it could equally well be designed as a blind aperture.

As FIG. 5 shows, in comparison with FIG. 6, the detent member 32 and the detent recess 23 are so associated with each other and so dimensioned that, on the pressure pin 13 adopting the pressure-in uncoupling position according to FIG. 5, the detent member 22 has travelled, in order to permit automatic renewed snapping-in, only to a slight extent out of the zone of the detent recess 23. As FIG. 5 shows, the detent member 22, which is designed as a ball, is still disposed with the main portion of its mass over the detent recess 23 so that, on releasing the rotation ring rotated out of the position according to FIG. 6 into the position according to FIG. 5, automatic renewed snapping-in into the position according to FIG. 6 takes place. Such renewed snapping-in is effected both due to the spring 25 acting on the detent member 22 and also due to the spring 8 acting on the pressure pin 13. Both springs are designed as compression springs.

In the case of the embodiment according to FIG. 7, there is provided a plurality of outlet apertures 28, emanating from the inner space 26 of the drive element designed as an electrical miniature motor and extending towards the annular gap 27 between the outer walls of the drive element 2 and the adjacent end walls of the rotation ring 15, for the cooling air flowing in per se known manner through the miniature motor. With this arrangement, the annular gap 27 extends obliquely rearwardly (i.e., obliquely towards the right in FIG. 7) in its outer zone, in order that the cooling air which flows away freely may, as indicated by the arrow, flow rearwardly along the outer walls of the drive element 2 constituted by a miniature motor.

I claim:

1. A coupling for connecting a dental handpiece to a drive element, comprising: a sliding connection sleeve having a recess formed therein being secured to said drive element; a coupling hook having a barb being resiliently supported in said connection sleeve; an inner annular groove being formed in said handpiece, the barb of said coupling hook being engaged in said groove; a pressure pin extending radially outwardly through an aperture formed in said connection sleeve; and a rotation ring mounted on said drive element and peripherally encompassing said connection sleeve so as to be rotatable but axially non-displaceable relative thereto, said rotation ring having a recess formed in the radially inner annular surface thereof, the radially outer end of said pressure pin adapted to be engaged in said recess, said recess having a depth decreasing gradually in the peripheral direction of said rotation ring towards at least one side to thereby facilitate radial displacement of said pressure pin and said coupling hook upon imparting rotational movement to said rotation ring.

2. A coupling as claimed in claim 1, said recess being at least partly cylindrical.

3. A coupling as claimed in claim 1, the radially outer end of said pressure pin having a partially cylindrical configuration.

4. A coupling as claimed in claim 1, the radially outer end of said pressure pin having a partially spherical configuration.

5. A coupling as claimed in claim 1, the peripheral outer surface of said rotation ring having grooves formed therein.

6. A coupling as claimed in claim 1, comprising stop means on said drive element for defining the uncoupling position of the coupling hook, said stop means limiting radially inward movement of the pressure pin so as to retain the pressure pin to project into the recess during periods of said coupling hook being in a depressed uncoupling position.

7. A coupling as claimed in claim 1, said rotation ring and said drive element including means, upon relative rotation into coupling position of said coupling and on engagement of the end of the pressure pin in the recess, being snapped-in relative to each other.

8. A coupling as claimed in claim 7, said rotation ring and said drive element; for effecting such snapping-in action, comprising a resiliently mounted detent member and cooperative detent aperture.

9. A coupling as claimed in claim 8, said detent member comprising a ball resiliently mounted in a blind aperture formed in said drive element; said detent aperture being formed in the inner peripheral wall of the rotation ring and having a circular cross-section of a diameter smaller than the diameter of said ball.

10. A coupling as claimed in claim 9, said detent member and said detent aperture being positioned relative to each other and being dimensioned so that, upon the pressure pin being displaced into the uncoupling position, the detent member is peripherally displaced only to a small extent out of the region of the detent recess so as to effect automatic return rotation of the rotation ring into the coupling position upon release thereof.

* * * * *